(12) United States Patent
Lacaze et al.

(10) Patent No.: US 7,084,524 B2
(45) Date of Patent: Aug. 1, 2006

(54) BI-DIRECTIONAL MATRIX CONVERTER WITH REVERSE START-UP

(75) Inventors: Alain Lacaze, Essert (FR); Sylvie Turri, Port-sur-Saone (FR)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 11/125,516

(22) Filed: May 10, 2005

(65) Prior Publication Data
US 2005/0237774 A1    Oct. 27, 2005

Related U.S. Application Data

(63) Continuation of application No. PCT/EP2003/050808, filed on Nov. 10, 2003.

(30) Foreign Application Priority Data
Nov. 11, 2002 (DE) ................. 102 52 234

(51) Int. Cl.
*H02J 3/02* (2006.01)
(52) U.S. Cl. .......................... 307/3; 318/800
(58) Field of Classification Search ............ 307/3, 307/25; 363/148, 149; 318/800
See application file for complete search history.

(56) References Cited
U.S. PATENT DOCUMENTS 4,853,664 A * 8/1989 Asakura ................. 336/12
5,214,366 A * 5/1993 Hollmann ................ 318/801
5,594,636 A   1/1997 Schauder ................ 363/160
5,969,966 A * 10/1999 Sawa et al. ................ 363/163
6,519,170 B1 * 2/2003 Lacaze et al. ............. 363/152
2002/0093840 A1  7/2002 Lacaze et al. ............. 363/152
2003/0052544 A1  3/2003 Yamamoto et al. ........... 307/66

FOREIGN PATENT DOCUMENTS

| DE | 100 51 222 | 4/2002 |
| EP | 1 199 794 | 4/2002 |
| EP | 1 286 455 | 2/2003 |
| JP | 2000-232785 | 8/2000 |

OTHER PUBLICATIONS

Thomas H. Barton: "Rectifiers, Cycloconverters, and AC Controllers", Clarendon Press, Oxford, 1994, pp. 420-479.

* cited by examiner

*Primary Examiner*—Shawn Riley
(74) *Attorney, Agent, or Firm*—Darby & Darby

(57) ABSTRACT

A method for operating a matrix converter that includes converting m phases of a generator into alternating voltage with n phases of a load connected to a network, wherein n<m. The n phases of the load are alternatingly connected via a multiple number of controllable bi-directional switches arranged in an (m×n) matrix, whereby n phases of the generator are always connected with the load while (m−n) phases of the generator are not connected with the load. The matrix converter may be used for at least part of the start-up process, in particular for the initial part of the start-up process of the generator reversely operating the matrix converter in cycloconverter mode using power available from the network, wherein the group of m phases of the generator are grouped in corresponding subgroups.

13 Claims, 4 Drawing Sheets

BI-DIRECTIONAL MATRIX CONVERTER WITH REVERSE START-UP

This patent application is a continuation of International Patent Application No. PCT/EP2003/050808, filed on Nov. 10, 2003, which claims priority to German Patent Application No. DE 102 52 234.0, filed on Nov. 11, 2002. The entire disclosure of both applications is incorporated by reference herein.

The present invention relates to the field of power electronics and in particular to power generation with a synchronous generator which is operated above the synchronous mains frequency, as well as the drive of variable-speed synchronous motors and induction motors. Particularly, the present invention relates to a method for operating a matrix converter which when being operated to convert m phases of a generator into alternating voltage with n (n<m) phases of a load connected to a network alternatingly connects the n phases of the load via a multiple number of controllable bi-directional switches arranged in an (m×n) matrix, whereby n phases of the generator are always connected with the load while (m−n) phases of the generator are not connected with the load. In addition, the present invention relates to a matrix converter for implementing the method.

BACKGROUND

In power generation, at a specified output, an increase of the rotary speed of a turbine is typically associated with a decrease in size and costs. Efficiency, too, can be improved. Already, power generation turbines up to 70 MW are connected to generators by way of gearing arrangements, so as to allow operation at higher rotary speeds. As the output increases, the use of gearing arrangements becomes increasingly difficult for safety reasons. In such cases, the turbine is operated at synchronous speed.

The use of a gearing arrangement is typically associated with the following disadvantages:
- a fixed transmission ratio;
- a noise level above 100 db for 40 MW, and above 115 db for 70 MW;
- mechanical losses irrespective of the particular load; and
- exacting requirements with regard to cooling and lubrication with oil.

The use of static frequency converters in the form of rectifier/inverter or the use of cycloconverters (power electronics) represents an alternative. The following advantages could be expected:
- reduced costs of the generator in agreement with a constant product of volume and rotational speed;
- a standardised generator for both 50 and 60 Hz;
- an adjustable speed which allows restoration of the partial-load efficiency of the turbine;
- reduced losses in relation to the gearing arrangement, at least in partial load;
- a substantial reduction in noise;
- clean (oil-free) cooling;
- no upper limit of the possible output, resulting in a significant reduction in the cost of the turbine by keeping it small—an option not provided by a gearing arrangement; and
- use of the generator as a starter motor (in the case of gas turbine applications).

Both in the case of power generation and in the case of drives, a reduction in losses of the static frequency converters or cycloconverters would bring about substantial cost savings. A reduction of the losses would above all have a bearing on investment costs because cooling accounts for a substantial part of the total costs of the converter.

Furthermore, reduced cooling requirements provide the option of keeping the electronics more compact, thus facilitating integration of the power electronics in the electric power station or even in the generator unit. Close integration of the power electronics in the generator unit would provide the additional advantage of short connection lines, shared coolant devices and a smaller overall volume (savings in building costs).

In the field of large drives of up to several 10 MW, these advantages also arise from the reduced losses, thus providing a competitive advantage compared to direct mechanical drives of a turbine.

The indirect conversion which is used in rectifier/inverters (AC/DC/AC) is caused by generating a directed direct current or a directed direct voltage from the three-phase source (mains in the case of motors; generator in the case of power generation). Subsequently, the direct current or the direct voltage is converted back to an alternating current by means of an inverter.

An inductance (current converter) or a capacitor bank (voltage converter) are switched into the intermediate circuit so as to reduce the ripple component of the current or the spikes.

These days, rectifier/inverters make use of thyristors. If natural commutation of the thyristors is possible, the losses in the converter are reduced. However, induction motors for example, take up reactive power. In order to make this reactive power from the net available, it should be possible to switch off the current in a specified arm of the converter at any desired time. In this case there is forced commutation and thus there are increased losses. In the electrical machine (generator or motor), the phase currents are chopped direct currents. The armature reaction does not rotate at constant speed and amplitude but instead jumps around according to the commutation cycle. A 6-pulse or 12-pulse converter provides six or twelve different angular positions for the armature reaction. This results in strongly pulsating torques and large additional losses in the electrical machine which can lead to deterioration of the machine. In 12-pulse converters the effect is 4 times smaller than in 6-pulse converters.

Voltage converters use GTOs with their inherent high switching losses, as well as IGBTs or IGCTs. The power of the individual components is less than that of thyristors, consequently, a larger number of components are required for a specified voltage or a specified current. Voltage converters can benefit from the use of pulse-width modulation techniques which improve the shape of the current curves and reduce the harmonics. The higher the switching frequencies the better, except with regard to losses and dielectric fatigue. The curve shape of the current can largely be sine-shaped so that a decrease of power of the electrical machine is avoided.

Direct conversion (AC/AC) is for example possible by means of a so-called cyclo-converter. Direct conversion provides significant advantages from the point of view of the electrical machine, because the current is more or less a sine-shaped wave rather than chopped direct current. It reduces the losses which occur additionally within the electrical machine and it also prevents pulsating torques.

However, the use of cyclo-converters limits the achievable frequency range to 0–⅓ of the input frequency. Due to imbalanced operation, exceeding the ⅓ limit results in overdimensioning up to a factor of 3.

Another possibility of direct conversion is provided by a so-called matrix converter in which each phase of a multi-phase source (generator or mains) is connected or connectable with each phase of a multi-phase load (mains, passive load, motors, etc.) by a bi-directional switch (see e.g. N. Mohan et al., Power Electronics, 2nd Edition, John Wiley & Sons, New York pp 11–12). The switches consist of an adequate number of thyristors to withstand the differential voltage between the phases, and the phase currents, and to allow current reversal. They can be regarded as truly bi-directional components with the options of jointly using additional wiring such as snubbers or the power supplies for the drive pulses for the antiparallel components.

The switches are arranged in an (m×n)-matrix at m phases of the source and n phases of the load. This provides the option of establishing any desired connections between the input phases and the output phases; however at the same time it has the disadvantage in that certain switching states of the matrix must not be allowed since otherwise for example a short circuit would result. Furthermore it is desirable to carry out commutation from one phase to another phase such that the lowest possible switching losses result.

U.S. Pat. No. 5,594,636 describes a matrix converter and a process for its operation in which commutation between the phases is partly carried out as a natural commutation, with a forced commutation where natural commutation is not possible. Although with this type of selection, switching losses are reduced due to natural commutation, those switching losses which arise from forced commutation still remain. Furthermore, the possible forced commutation necessitates the use, in all positions on the matrix, of components which can be switched off. This considerably increases the switching expenditure.

However, it is possible to operate a matrix converter in a way that only natural commutations are being used. This can be achieved by only allowing the switching over from a selected connected phase of the generator to a selected not connected phase of the generator only if certain conditions are met. However, this mode of operation allowing a cheap and reliable control of the matrix converter can only be used to control frequency but not to control the voltage. Voltage is therefore controlled by means of the excitation system, as usual in large power generation. This voltage control strategy does not cause any problem when the rotating machine is operated in generating mode. But when the rotating machine is used as a motor, torque and current control, at low speed, requires a real voltage modulation, in-line with the so-called constant V/f rule.

When the prime mover of the power generation unit is a gas turbine, it is a usual practice to use a static frequency converter, i.e. rectifier/inverters, to operate the generator as a motor to start-up the shaft. The gas turbine does not produce a positive torque before it has reached 40–50% of the rated speed. So while to provide a matrix converter based on fully natural commutation has various advantages, it still necessitates to provide additional means to start-up the gas turbine unit in particular in a range between 0 to 20% load, where the so-called constant V/f rule has to be met. The strong attractiveness of the naturally commuted converter, in terms of cost, compactness and efficiency, is consequently reduced by the need for an additional starting device.

SUMMARY OF THE INVENTION

It is an object of the invention to provide a method for operating a matrix converter, a matrix converter, as well as a use of such matrix converter, which avoid the disadvantages of the known matrix converter solutions in the sense that, e.g., for the start-up of the turbine using the generator as start-up device, alternatives to the use of separate cycloconverters or static frequency converters shall be made available.

The invention includes operating the matrix converter in "reverse mode", so to speak, as a cycloconverter. The fact that this is possible quite easily and without any modification of the hardware of the matrix converter by simply changing of the mode of operation of the matrix converter and by providing means grouping the m phases of the generator in corresponding subgroups, is unexpected and makes it possible to use such mode of operation of a matrix converter for starting up a gas turbine unit by using the generator as motor and the mains as power source.

According to a first preferred embodiment of the present invention, the matrix converter, when being operated to convert energy from the generator to the load, only allows to control frequency but not voltage. In particular in this case, where such matrix converters cannot be used in a reverse mode for start-up of a gas turbine unit directly due to the "constant V/f rule" necessitating the control of voltage at least within the first part of the start-up of the generator which behaves like an electrical machine, the switching between the two modes is advantageous.

According to still another preferred embodiment of the present invention, the method is characterised in that the matrix converter, when being operated to convert energy from the generator to the load, only allows the switching over from a selected connected phase of the generator to a selected non-connected phase of the generator, such that only natural commutations occur. Such a matrix converter as well as a mode of its operation has been disclosed in DE 10051222 A1 as well as in the corresponding EP 1199794 A2, the entire content of which documents shall be explicitly incorporated by reference herein. Usually the switching state of the switches, the connection state of the phases of the generator, and the signs of the currents in the phases of the generator, and the differential voltages between the phases of the generator, are monitored or measured. At specified, preferably periodic, points in time switch-over occurs and for switch-over one or several phases of the generator are selected, which phases of the generator according to the information gained from monitoring or from measuring are not connected and fulfil the conditions. In particular antiparallel thyristors are used as bi-directional switches The matrix converter, as disclosed in the above-mentioned documents, only allows the control of frequency but not of the voltage and can therefore not directly be used in a reverse mode to start-up the generator at least within the initial part of the start-up. However, using the slight modification consisting in the above-mentioned grouping of the m generator phases into subgroups allows to operate even such matrix converter in a reverse mode at the same time controlling frequency and voltage.

According to another preferred embodiment the generator comprises 6 phases and the load comprises 3 phases, and for cycloconverter mode the 6 phases are grouped into 3 subgroups. For this particular topology only two switches are necessary for groping the phases of the generator.

Further preferred embodiments are described in the claims.

The present invention additionally concerns the use of a method as described above for starting up of a generator. More particularly, for starting up the generator i.e. the generator and the (gas) turbine, up to 20 to 30% of the rated speed of the generator, the matrix converter is operated in cycloconverter mode, while from 20 to 30% of the rated speed up to 50% or even up to 100%, the matrix converter is used in its normal operating mode without disconnected subgroups. As it is well known, only within the first 20 to 30% of the rated speed of the generator, voltage control is necessary while in the range above of that mere frequency control is sufficient. It is therefore sufficient to operate the matrix converter in cycloconverter mode in the initial range which absolutely necessitates voltage control and to switch to normal matrix converter mode, preferably strictly only using natural commutations, as described above.

Further preferred embodiments of the above-mentioned use are described in the claims.

Apart from the above, the present invention also relates to a matrix converter for implementing the mode of operation of a matrix converter as described above, or to be used as described above. The matrix converter comprises a multiple number of controllable bi-directional switches arranged in an (m×n) matrix, said switches, controlled by a control system, selectably connecting m inputs with n outputs, and is characterised in that first means for determining the signs of the currents in the inputs, and second means for determining the signs of the voltages between the inputs are provided, and that the first and second means are in active connection with the control system. Such a matrix converter has e.g. for the case of natural commutations only, been disclosed in DE 10051222 A1 as well as in the corresponding EP 1199794 A2, the content of which documents shall be explicitly included in this application also with respect to the matrix converter itself and shall form integral part of this disclosure. Such a matrix converter is preferably characterised in that the switches, which are preferentially comprising antiparallel-switched thyristors, are connected to the control system (control unit) via a signal line by way of which information concerning the switch state of the switches is transmitted to the control system.

Still further preferred embodiments of the matrix converter according to the invention are described in the claims.

Last but not least the present invention also relates to a whole generator unit comprising at least one matrix converter as described above and at least one generator, which generator comprises a rotor and a stator, characterised in that for switching to cycloconverter mode switches are provided on the windings of stator allowing to form the corresponding subgroups. In other words the floating ground usually existing on the side of the stator opposite to where the matrix converter is connected can be grouped into subgroups as described above by means of simple switches allowing to either have a common floating ground or subgroups (the switches are then open).

In still another preferred embodiment of the present invention, the generator comprises 6 phases and the load comprises 3 phases, wherein for cycloconverter mode, the 6 phases are grouped into 3 subgroups. In this case preferably 2 switches are provided allowing to connect the floating ground of the windings of the stator for normal matrix converter mode and allowing to disconnect said floating ground into three disconnected subgroups, each of which comprise two connected generator phases.

Further embodiments result from the claims.

BRIEF DESCRIPTION OF THE DRAWINGS

Below, the invention is explained in more detail by means of embodiments in conjunction with the drawings, in which.

DETAILED DESCRIPTION

Figure 1:
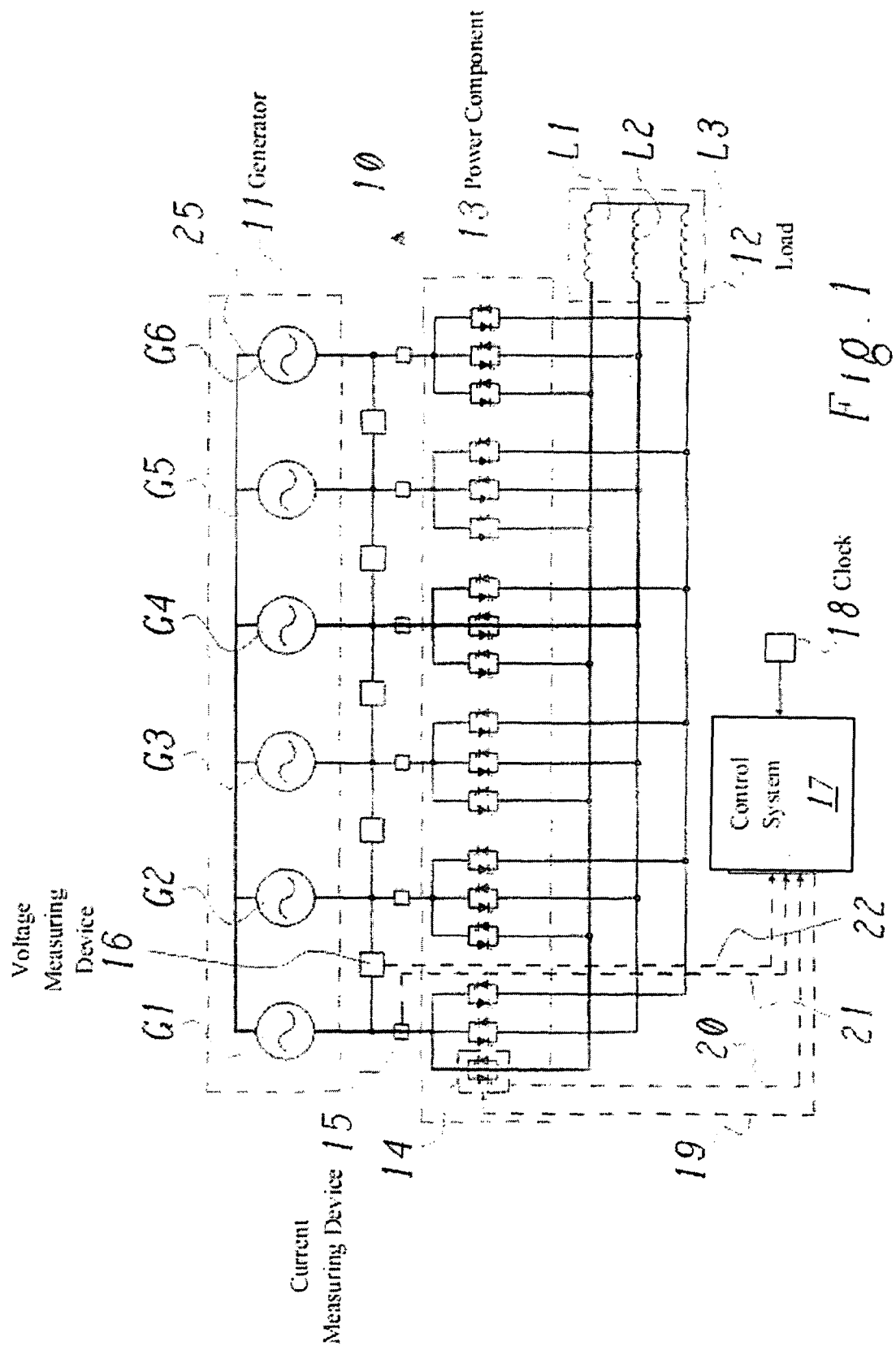
FIG. 1 of is a diagrammatic representation of the commutation with a matrix converter comprising 6 input phases and 3 output phases as it can be used for fully natural commutation.

FIG. 1 shows a schematic circuit diagram of a matrix converter comprising 6 input phases and 3 output phases which is designed and controlled to allow natural commutations only. Such a matrix converter has been disclosed in DE 10051222 A1 as well as in the corresponding EP 1199794 A2. The proposed principle can however also be applied to matrix converters which use forced commutation. A matrix converter as described in these documents as well as its mode of operation as described therein shall form the basis for the examples given here. The matrix converter 10, when being used to convert the frequency of the voltage generated by the generator 11 to a frequency as requested by the load 12, i.e. the grid to which the generator is connected, in a time sequence 6 connects phases G1, . . . , G6 of a generator 11 to the 3 phases L1, . . . ,L3 of a load 12. The power component 13 required for it comprises 18 bi-directional switches 14 in the form of antiparallel switched thyristors. The switches 14 are arranged in a (6×3) matrix. A control system (control unit) 17 is provided for selecting the switches 14, said control system receiving time signals from a clock 18 (a clock frequency). The switching state of the switches 14 (ON, OFF) is monitored and in each case reported to the control system 17 via a first signal line 20. In each instance the switches 14 are selected by the control system 17 via a control line 19.

In each of the individual phases G1, . . . , G6 of the generator 11, a current measuring device 15 is arranged in each instance which reports the sign of the phase current via a second signal line 21, to the control system 17. In addition, voltage measuring devices 16 are arranged between the phases G1, . . . , G6 of the generator 11, said voltage measuring devices reporting the sign of the respective phase difference voltage to the control system 17 via a third signal line 22.

As disclosed in DE 10051222 A1 as well as in the corresponding EP 1199794 A2, a commutation criterion can be derived for commutation within the matrix converter 10, said commutation criterion being essentially based on the sign of the product of the phase difference voltage between the phase to be switched off and the phase to be switched on and of the phase current in the phase to be switched off. If this product is negative, commutation between these two phases is allowed. Otherwise commutation is prohibited. Commutation is triggered by the control system 17, if a commutation is present after a specified time and if the commutation criterion is met. Since for commutation a "free" phase of the generator 11 is required and since in each instance certain switches 14 must not be activated, so as to avoid short circuits, the control system 17 must know at all times which of the phases G1, . . . ,G6 are free, i.e. in which of the phases G1, . . . ,G6 all associated switches 14 are open, i.e. not carrying any power. The control system 17 must also know to which of the output phases L1, . . . ,L3 the phase which is to be commuted is switched, so as to precisely switch on that switch which is suitable for this commutation. The above-mentioned commutation criterion is based on the physical premise that a natural commutation between two phases of the generator 11 can only be carried out successfully if at the point of time of commutation t0 the absolute value of the current iGx of the phase Gx from which one wants to commutate, is falling, while the absolute value of the current iGy of the phase Gy to which one wants to commutate, is rising. This necessary condition means that the phase to which one wants to commutate, has a higher electromotive force than, and the same sense of direction as, the phase from which one wants to commutate. However, since the electromotive force can only be measured during idling, the criterion is to be established with easily accessible or measurable quantities.

As discussed extensively in DE 10051222 A1 as well as in the corresponding EP 1199794 A2, one can find a commutation criterion to select natural commutations only, which is given by:

$$I_k \cdot (V_k - V_l) \cdot K_{ijkl} < 0 \qquad (1)$$

with the constant $K_{ijkl}$ depending on the mutual inductances of the phases of the generator and the inductance of the load. Thus if the constants $K_{ijkl}$ determined by the self-inductances and mutual inductances of the generator and the load are known, by means of the easily measurable quantities phase current $I_k$ and phase difference voltage $V_k - V_l$ signs it can be determined at all times whether or not an intended natural commutation between the phases k and l of the generator can be carried out. The condition or rule (1) only depends on the signs of the currents and voltages, not however on their actual values. Thus the information necessary for the commutation condition can be obtained with very simple detectors or measuring devices.

The decision process which in the case of a matrix converter 10 according to FIG. 1 leads to selection of the switches 14, is very simple:

First the clock 18 tells the control system 17 at what point in time according to the desired frequency and if applicable according to any feedback information, a new commutation is to take place, i.e. at what point in time the phases presently connected to the load 12 are to be replaced by other phases.

As a result of continuous monitoring of the switches 14 and the phases G1, . . . , G6, the control system 17 knows which phases are free, i.e. do not carry any current, and which phases can subsequently be safely commutated. If one or two commutations are possible, the associated switches 14 are triggered. As has already been mentioned above, simultaneous commutation of three phases is avoided. Any second and third commutations (possible per se) are postponed until they can be carried out safely.

Such a matrix converter does not have any inherent reactive power consumption. The cyclo-converter for example, which also carries out a direct AC/AC conversion has a very small power factor due to the trigger delays necessary to achieve a sine-shaped voltage. Indirect converters also display a reduced power factor due to the margin of commutation and the magnetisation power necessary for chopping the direct currents.

Overall such a matrix converter operated using natural commutations only presents the following advantages:

(1) concerning the cyclo-converter:
The power factor of the converter is almost 1 instead of 0.7, so that the input power, the power of the components and the loss power are reduced.
Irrespective of the improved power factor, the new conversion process brings about inherent losses which are reduced by a factor of 2, thus allowing a lighter and more cost-effective cooling system.
The output frequency is not limited to ⅓ of the input frequency.
The control electronics are very simple.

(2) concerning the indirect AC/DC/AC converter (static frequency converter, rectifier/inverter):
The power factors on the input side and on the output side are the same, so that input power and power range of the components are minimised.
Operation is completely reversible.
There is no intermediate storage of energy, which results in cost savings and prevention of losses.
There are no pulsating torques, only a low content of harmonics and no decrease of power at the input due to chopped direct currents.
Slight loss power.

A synchronous machine connected to the matrix converter 10 can be operated either as a motor or as a generator. It can be switched from motor operation to generator operation and can thus be used as a starter motor. Both lead and lag operations are possible without changing the control method. Autonomous operation is also possible in which the voltage is determined by excitation of the generator and frequency control is divided between the generator 11 and the converter.

However, as mentioned above, such a matrix converter does only allow conversion of the frequency but cannot be used for controlling the voltage. To start up the rotor by using it as a motor, at low speed, a real voltage modulation is required, which cannot be provided by such a matrix converter. The well known start-up problem comes from the fact that a rotating electrical machine is nearly a pure inductance, due to a very weak electrical resistance. Therefore the impedance is more or less proportional to the rotating speed. At standstill, the rotating machine is nearly a short circuit and the applied voltage should be reduced. Up to a substantial fraction of the rated speed, the applied voltage must be proportional to the rotating speed (constant V/f rule). Voltage control is useless as soon as the rotation speed exceeds 20 to 30% of the rated speed. It is of uppermost importance to notice that this is perfectly matching the frequency range of a cycloconverter, which output frequency is limited to ⅓ of the source (grid) frequency.

Figure 2:
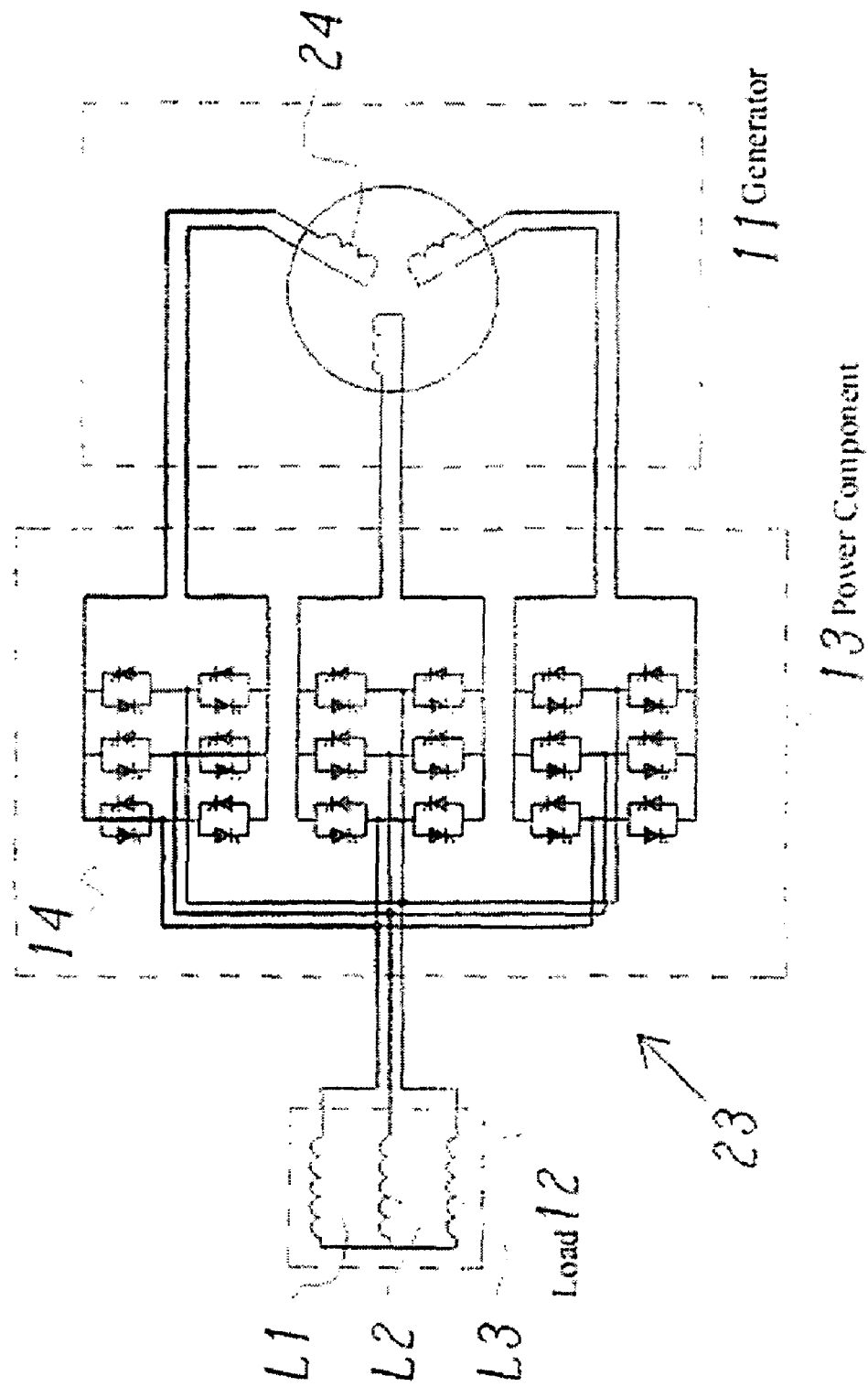
FIG. 2 shows the schematic circuit diagram of a cycloconverter with 3 input phases and 3 output phases according to a preferred embodiment of the invention.

Let us compare the architecture of the matrix converter, see FIG. 1, to the well known cycloconverter architecture of FIG. 2.

The number of switches is the same in both cases. The only topological discrepancy is on the star point connection of the rotating machine.

From an operating point of view, as shown in FIGS. 1 and 2, the path of current is also quite similar. In these figures, similar paths in a matrix converter (FIG. 1) and in a cycloconverter (FIG. 2) have been marked by thick lines to show that indeed, one can find identical paths for these two topologies. The question however remains, how it is possible to allow the switching from cycloconverter mode to matrix converter mode.

Figure 3:
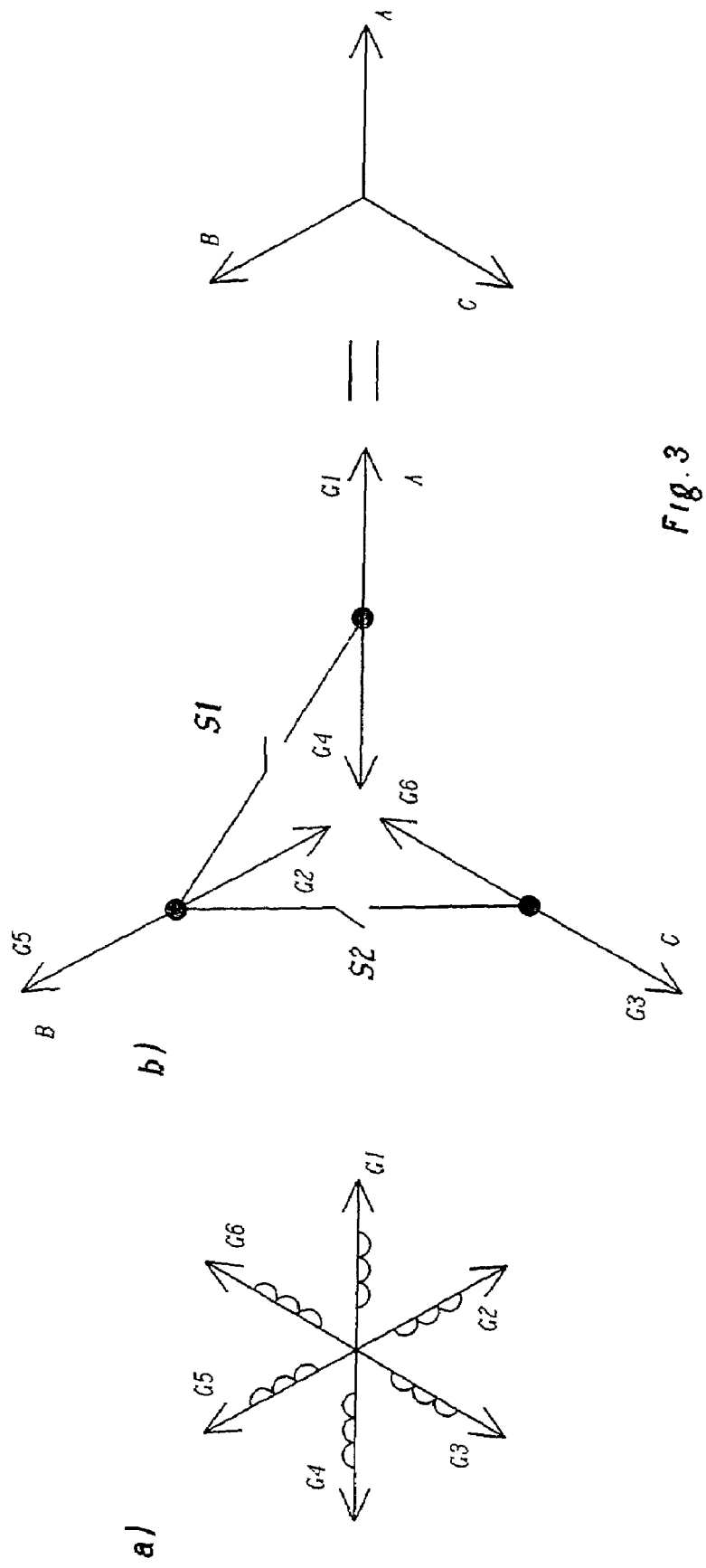
FIG. 3 shows a schematic sketch of the phase connections in both operating modes.

A careful analysis of the situation reveals that only minor modifications are required to allow a matrix converter to be operated in cycloconverter motor:

The sketch of FIG. 3 shows that only 2 additional switches are required to be able to switch from one operating mode to the other for six generator phases and three mains phases. FIG. 3 a) shows the conditions when the matrix converter is operated in matrix converter mode in a six phase arrangement and with a common floating ground 25 as shown in FIG. 1. FIG. 3b) shows the two switches S1 and S2 which are necessary to allow a "reverse" operation of the matrix converter in cycloconverter mode. The sketch of FIG. 3 therefore shows that only 2 additional switches are required to be able to switch from one operating mode to the other.

Figure 4:
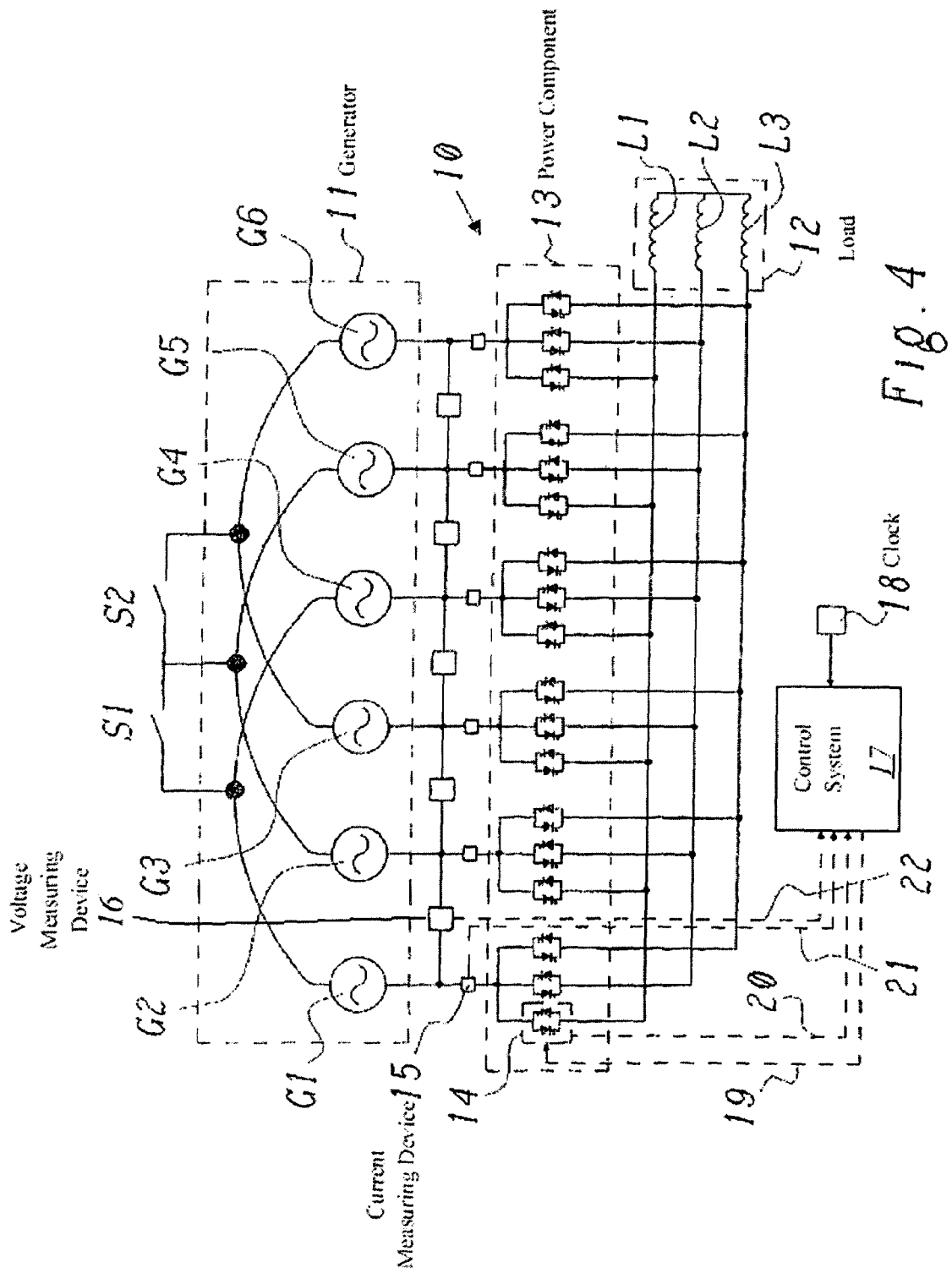
FIG. 4 shows a schematic circuit diagram of a matrix converter connected to six phases of the generator to be started up, with means to operate the matrix converter in cycloconverter mode.

The implementation of the set of two switches is shown on the schematic diagram of FIG. 4. In other words to allow the switching between the two modes of operation simply two (or more in the case of a different number of phases) switches have to be provided on the windings of the stator to allow to disconnect the floating ground 25, which is necessary for matrix converter operation mode, into subgroups A,B,C necessary for a cycloconverter mode of operation. The switches can be mechanical switches as well as switches from solid-state. The switches have to be open for cycloconverter mode, and for matrix conversion mode the switches are simply closed to have a common floating ground 25.

Advantages of the Proposed Solution:

The first advantage of the proposed solution lies on the fact that it is a very minor change, i.e. normal operation of the matrix converter and related hardware does not change.

Another advantage is that the cycloconverter mode is well known to the person skilled in the art and there is no need for further development for this mode of operation (for general information related to cycloconverters e.g. the book by Thomas H. Barton: Rectifiers, Cycloconverters and AC Controllers, Clarendon Press, Oxford, 1994, in particular pages 420 to 478, may be consulted).

Furthermore, there is no stringent requirement on the additional switching means. They can be mechanical switches or from solid-state.

The cutting power of the switch is very low. Switches are normally open at standstill, when voltage and current are null. They are closed as soon as the cycloconverter mode is completed. If one needs to switch back from matrix to cycloconverter mode, it is always possible to switch off all the switches of the converter to cancel all the currents within a few milliseconds.

It is thus a very cheap and reliable solution.

If one wants to use now such a matrix converter for starting up the unit, i.e. using the generator as a motor, the following has to be observed:

Assuming that the grid has a frequency of about 50 Hz, up to approximately 10 to 15 Hz, when starting up the unit, the voltage has to be controlled in a substantially linearly increasing manner (V/f rule). This can, as described above, not be done by using the matrix converter in its matrix conversion mode as no voltage control is possible. However, as also described above, a cycloconverter allows voltage control and allows the conversion of frequency up to a frequency of ⅓ of the mains, which in this case is given by the above-mentioned 50 Hz. Consequentially, if the grid is used as the mains, cycloconverter mode is possible up to a frequency of approximately 16 Hz, which perfectly matches the present situation, as for higher frequencies no voltage control is necessary anymore, and the rotor can be driven by the matrix converter in its matrix conversion mode. In other words, the two modes of operation, matrix converter mode and cycloconverter mode, ideally match each other for the start-up of a generator, as cycloconverter mode is only reasonably possible up to ⅓ of the mains frequency, and at the same time allows voltage control, while for higher frequencies, the driving of the generator does not have to be carried out under voltage control allowing the matrix conversion mode of operation. Therefore to provide the above-mentioned switching means allows to avoid the need of a separate starting device for the power generation unit making significant savings possible.

Therefore the following start-up strategy is proposed:

Use the matrix converter as a cycloconverter up to 20 to 30% of the rated speed. This speed is still below the one when the gas turbine starts to produce work. From 20–30% of rated speed, up to 50%, or even 100%, the matrix converter is simply used in its normal operating mode, where it only performs frequency control.

What is claimed is:

1. A method for operating a matrix converter and at least one generator having windings, the method comprising:
    operating the matrix converter in a normal mode to convert m phases of a generator into alternating voltage with n phases of a load connected to a network, wherein n<m, the matrix converter alternatingly connecting the n phases of the load using a plurality of controllable bi-directional switches arranged in an (m×n) matrix, wherein n phases of the generator are always connected with the load and (m−n) phases of the generator are not connected with the load;
    switching the matrix converter to a cycloconverter mode using a plurality of further switches disposed on the windings; and
    operating the matrix converter in the cycloconverter mode using power available from the network, m phases of the generator being grouped in corresponding subgroups in the cycloconverter mode using the plurality of further switches, wherein the further switches allow a floating ground of the windings to be connected during operation of the matrix converter in the normal mode and allow the floating ground to be disconnected into disconnected subgroups.

2. The method as recited in claim 1, wherein the operating of the matrix converter to convert energy from the generator is performed so as to allow a control of the frequency and to disallow a control of the voltage.

3. The method as recited in claim 1, wherein the operating of the matrix converter to convert energy from the generator is performed so as to allow a switching over from a selected connected phase of the generator to a selected non-connected phase of the generator, such that only natural commutations occur.

4. The method as recited in claim 1, wherein m is equal to 6, n is equal to 3, and the operating of the matrix converter in the cycloconverter mode includes grouping the 6 phases into 3 subgroups.

5. The method as recited in claim 1, wherein the bi-directional switches include antiparallel thyristors.

6. The method as recited in claim 1, wherein the operating of the matrix converter in the cycloconverter mode is performed so as to start up the generator.

7. A method for operating a matrix converter, the method comprising:
    operating the matrix converter to convert m phases of a generator into alternating voltage with n phases of a load connected to a network, wherein n<m, the matrix converter alternatingly connecting the n phases of the load using a plurality of controllable bi-directional switches arranged in an (m×n) matrix, wherein n phases of the generator are always connected with the load and (m−n) phases of the generator are not connected with the load; and operating the matrix converter in a cycloconverter mode using power available from the network, m phases of the generator being grouped in corresponding subgroups in the cycloconverter mode, wherein the operating of the matrix converter in the cycloconverter mode is performed so as to start up the generator, and wherein the matrix converter is operated in the cycloconverter mode for up to a predetermined percentage of a rated speed of the generator, and is operated to convert energy from the generator without disconnected subgroups from the predetermined percentage up to 50% of the rated speed of the generator, wherein the predetermined percentage is 20 to 30%.

8. The method as recited in claim 7, wherein the matrix converter is operated to convert energy from the generator from the predetermined percentage up to 100% of the rated speed of the generator.

9. A matrix converter operable in a normal mode to convert energy from a generator having windings and operable in a cycloconverter mode using power from a network, the matrix converter comprising:

a plurality of controllable bi-directional switches arranged in an (m×n) matrix selectably connecting m inputs with n outputs;

a control system controlling the plurality of controllable bi-directional switches and controlling a plurality of further switches disposed on the windings of the generator for switching the matrix converter to the cycloconverter mode and for allowing formation of corresponding subgroups, wherein the further switches allow a floating ground of the windings to be connected during operation of the matrix converter in the normal mode and allow the floating ground to be disconnected into disconnected subgroups;

a first device in active connection with the control system and configured to determine the signs of current in the inputs; and a second device in active connection with the control system and configured to determine the signs of voltages between the inputs.

10. The matrix converter as recited in claim 9, further comprising a signal line connecting the plurality of switches to the control system, wherein information concerning a switch state of the switches is transmitted to the control system by way of the signal line.

11. The matrix converter as recited in claim 9, wherein the bi-directional switches include antiparallel-switched thyristors.

12. A generator unit comprising at least one matrix converter as recited in claim 9, and further comprising at least one generator having a rotor and a stator including windings, and a plurality of further switches disposed on the windings for switching the matrix converter to the cycloconverter mode and allowing formation of corresponding subgroups.

13. The generator unit as recited in claim 12, wherein m is equal to 6 and n is equal to 3, wherein the plurality of further switches includes two further switches for allowing a floating ground of the windings to be connected during operation of the matrix converter in the normal mode and for allowing the floating ground to be disconnected into 3 disconnected subgroups, each of the subgroups including 2 connected generator phases.

* * * * *

UNITED STATES PATENT AND TRADEMARK OFFICE
CERTIFICATE OF CORRECTION

| | | |
|---|---|---|
| PATENT NO. | : 7,084,524 B2 | Page 1 of 1 |
| APPLICATION NO. | : 11/125516 | |
| DATED | : August 1, 2006 | |
| INVENTOR(S) | : Alain Lacaze et al. | |

It is certified that error appears in the above-identified patent and that said Letters Patent is hereby corrected as shown below:

In the Title: item (54) and col. 1, line 1, delete "BI-DIRECTIONAL MATRIX CONVERTER WITH REVERSE START-UP" and substitute with -- BI-DIRECTIONAL MATRIX CONVERTER WITH REVERSE START-UP MEANS AND METHOD FOR OPERATING A BI-DIRECTIONAL MATRIX CONVERTER --.

Signed and Sealed this

Twenty-sixth Day of December, 2006

JON W. DUDAS
*Director of the United States Patent and Trademark Office*